N. O. ERICKSON.
COMPARTMENT CONVEYER.
APPLICATION FILED JAN. 23, 1915.
1,241,204.
Patented Sept. 25, 1917.
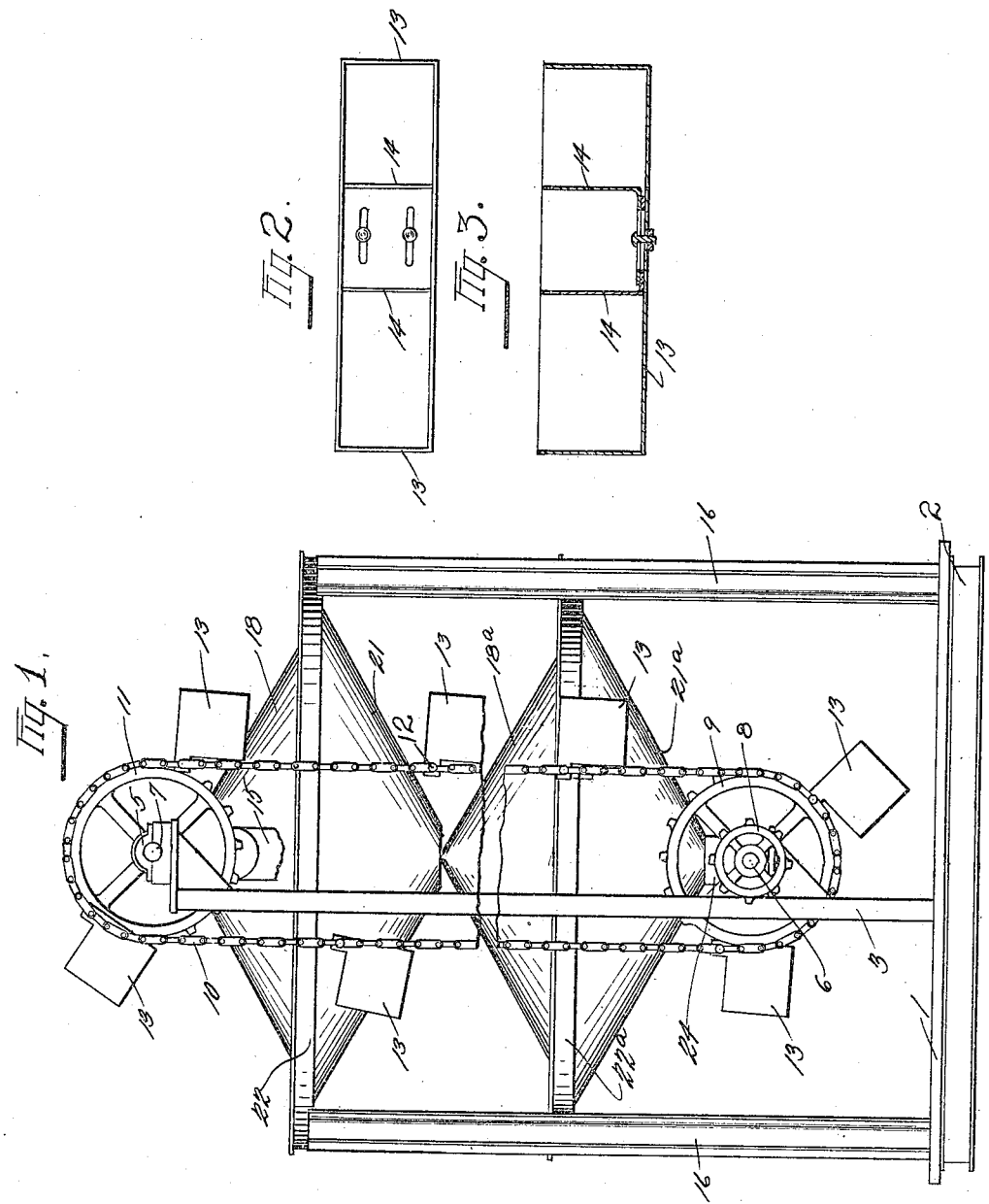

UNITED STATES PATENT OFFICE.

NILS O. ERICKSON, OF BLACK RIVER FALLS, WISCONSIN.

COMPARTMENT CONVEYER.

1,241,204. Specification of Letters Patent. Patented Sept. 25, 1917.

Application filed January 23, 1915. Serial No. 3,964.

*To all whom it may concern:*

Be it known that I, NILS O. ERICKSON, a citizen of the United States of America, residing at Black River Falls, in the county of Jackson and State of Wisconsin, have invented certain new and useful Improvements in Compartment Conveyers, of which the following is a specification.

This invention relates to improvements in buckets and more particularly to buckets adapted for use in connection with conveyers. With the foregoing and other objects in view the invention consists in the combination and arrangement of parts to be hereinafter fully described, pointed out in the appended claims and illustrated in the accompanying drawing which forms a part of this specification and in which—

Figure 1 is an end view of a conveyer equipped with my improved buckets.

Fig. 2 is a top plan view of one of the buckets.

Fig. 3 is a vertical sectional view through Fig. 2.

Like reference characters denote corresponding parts throughout. The reference numeral 1 designates the base of a conveyer arranged upon supports 2 and upon said base the uprights 3 are disposed which carry upper and lower bearings 5 in which shafts 6 and 7 are journaled. The shaft 6 is provided terminally with the wheel 8 that is driven by the motor (not shown) and it also carries sprocket wheels 9, one upon each side of the structure, that are connected by conveyer chains 10 to the sprocket wheels 11 of shaft 7. Upon the conveyer chains the rods 12 are carried that carry the buckets 13 formed with adjustable partitions 14, 14 that divide the buckets into three compartments of variable sizes. The several buckets empty their contents, which consist of particles of inert material, usually sand in one compartment and gravel in another and an active cementing substance, usually cement in another compartment, into a hopper (not shown) which empties into the chute 15 that leads from approximately the top of the frame composed of the uprights 3 down to a frame composed of uprights 16.

A dome 18 is disposed upon and secured to a hopper 21 carried by a metal band 22 that is secured to the frame composed of uprights 16. The hopper 21 is apertured at its lowest point which is disposed immediately over a dome 18$^a$ similar to dome 18 and supported in a similar manner upon a hopper 21$^a$ carried by a metal band 22$^a$ carried by the uprights 16. The hopper 23$^a$ is formed with a neck 24 provided with a suitable check valve by means of which the evacuation of its contents may be regulated.

In operation the compartments of each bucket of the conveyer are filled and dumped, in the usual manner, into the hopper from which they gravitate through the chute 15 and from the same upon the dome 18 and over the same into the hopper 21. At this point water is added to the mixture and the moist mixture falls upon the dome 18$^a$ and there is automatically spread and thoroughly mixed and agitated as it moves into the hopper 21$^a$ from which it may be released in the form of the perfect product ready for use.

What is claimed is:—

1. In a compartment conveyer, buckets, transverse partitions for said buckets, said partitions being formed with bases slidably arranged upon each other and upon the bucket-bottoms and means connecting said buckets and partitions for limiting the relative movement of the latter members.

2. In a compartment conveyer, buckets, transverse partitions each movable longitudinally of said buckets and formed with longitudinally slotted bases arranged upon each other and upon the bucket-bottoms, and bolts carried by said bucket-bottoms and extending through the slotted portions of said partition bases.

In testimony that I claim the foregoing as my own I have hereto affixed my signature in the presence of two subscribing witnesses.

NILS O. ERICKSON.

Witnesses:
RUFUS A. JONES,
ANNA M. HAUGSTAD.

Copies of this patent may be obtained for five cents each, by addressing the "Commissioner of Patents, Washington, D. C."